(12) United States Patent
Huck

(10) Patent No.: US 12,145,748 B2
(45) Date of Patent: Nov. 19, 2024

(54) METHOD AND SYSTEM FOR NON-DESTRUCTIVE INSPECTION OF AN AERONAUTICAL COMPONENT

(71) Applicant: SAFRAN, Paris (FR)

(72) Inventor: Alexis Reynald Paul Huck, Moissy-Cramayel (FR)

(73) Assignee: SAFRAN, Paris (FR)

( * ) Notice: Subject to any disclaimer, the term of this patent is extended or adjusted under 35 U.S.C. 154(b) by 344 days.

(21) Appl. No.: 17/905,241

(22) PCT Filed: Mar. 9, 2021

(86) PCT No.: PCT/EP2021/055924
§ 371 (c)(1),
(2) Date: Aug. 29, 2022

(87) PCT Pub. No.: WO2021/180726
PCT Pub. Date: Sep. 16, 2021

(65) Prior Publication Data
US 2023/0132883 A1 May 4, 2023

(30) Foreign Application Priority Data
Mar. 13, 2020 (FR) ...................................... 2002497

(51) Int. Cl.
*G06T 7/00* (2017.01)
*B64F 5/60* (2017.01)
*G06T 3/4038* (2024.01)
(52) U.S. Cl.
CPC .............. *B64F 5/60* (2017.01); *G06T 3/4038* (2013.01); *G06T 7/0004* (2013.01); *G06T 2207/10048* (2013.01)

(58) Field of Classification Search
CPC ......... G06T 7/0004; G06T 2207/10048; G06T 2207/20081; B64F 5/60
See application file for complete search history.

(56) References Cited

U.S. PATENT DOCUMENTS 6,751,342 B2 * 6/2004 Shepard .................... G06T 7/42
374/10
8,287,183 B2 10/2012 Shepard et al.
(Continued)

FOREIGN PATENT DOCUMENTS

CN 110322429 A 10/2019

OTHER PUBLICATIONS

Search Report from the French Intellectual Property Office on corresponding FR application (FR2002497) dated Nov. 5, 2020.
(Continued)

*Primary Examiner* — Kent Yip
(74) *Attorney, Agent, or Firm* — Alumen IP Law PC

(57) ABSTRACT

A method for the non-destructive inspection of an aeronautical component having a step of obtaining a plurality of digital images of a unit area of the aeronautical component, a step of estimating a characteristic image representative of the unit area, each pixel of the characteristic image having a characteristic vector, a step of dividing the characteristic image into a plurality of micro prediction zones, a step of comparing the characteristic vector of each pixel in each micro prediction zone with a previously estimated local statistical model of the micro prediction zone, the local model of a micro prediction zone being obtained by means of a learning algorithm from characteristic vectors of pixels in a micro learning zone of the annotated characteristic image which includes the micro prediction zone.

10 Claims, 8 Drawing Sheets

(56) References Cited

U.S. PATENT DOCUMENTS

| | | |
|---|---|---|
| 9,519,844 B1 | 12/2016 | Thompson et al. |
| 10,546,207 B2 | 1/2020 | Sundaresan et al. |
| 2005/0008215 A1 | 1/2005 | Shepard |

OTHER PUBLICATIONS

International Search Report and Written Opinion on corresponding PCT application (PCT/EP2021/055924) from International Searching Authority (EPO) dated May 14, 2021.

* cited by examiner

METHOD AND SYSTEM FOR NON-DESTRUCTIVE INSPECTION OF AN AERONAUTICAL COMPONENT

TECHNICAL FIELD

The invention relates to the general field of aeronautics. It more particularly relates to the non-destructive inspection by active infrared thermography of aeronautical components, such as components with complex geometry equipping aircraft engines such as for example inner fixed structures (IFS) or other sandwich composite structures of thrust reversers. No limitation is attached however to the type of aeronautical component considered nor to the material of which this component is composed, it may be indifferently a composite material or not.

BACKGROUND

In a known manner, non-destructive inspection designates a set of methods that make it possible to characterize the integrity state and/or the quality of structures or materials without degrading them. Non-destructive inspection has a preferred but non-limiting application in the aeronautics field, and more generally in any field in which the structures of which it is wished to characterize the state or the quality are expensive and/or their operating reliability is critical. Non-destructive inspection may advantageously be carried out on the considered structure or material not just while being produced but also while being used or while in maintenance.

Active thermography, or active infrared thermography, is one of the known techniques used to carry out non-destructive inspections in the aeronautics field. It is based first of all on a controlled excitation of the considered component. This excitation leads to a change of thermal state of the component (for example to an instantaneous rise in the surface temperature of the component of several degrees in the case where the excitation source is a flash lamp). Furthermore, one observes by means of an infrared camera the evolution of the temperature on the surface of the component (for example the progressive decrease in the temperature on the surface of the component in the case of an excitation by flash lamp). The infrared camera supplies a temporal sequence of digital thermal images representing at different instants the temperature at different points of the surface of the component. For example, each digital image is an image encoded in gray levels on which each pixel associated with a point of the component has a gray level representative of an increasing function of the temperature at this point at the instant of the acquisition of the digital image. Observation of the temporal sequence of digital thermal images supplied by the infrared camera makes it possible to detect the presence of anomalies in the evolution of the temperature on the surface of the component which could be caused by defects inherent in the component (e.g., voids, inclusions, etc.) and which could perturb the diffusion of heat from the surface to inside the component.

The complete non-destructive inspection of a component of large dimension (several square meters typically for an IFS for example) requires in practice conducting several "unit" acquisitions of temporal sequences of thermal images to cover the entire surface thereof, each unit acquisition concerning a different so-called unit acquisition zone of the component. The juxtaposition of unit zones thus makes it possible to obtain a representation of the component as a whole, while taking into account a potential overlap zone between each unit acquisition.

In order to detect the presence of anomalies in a unit zone of the aeronautical component from the temporal sequence of digital thermal images of the unit zone, it has been proposed to form an image of characteristics of the unit zone that associates with each pixel of the image a vector of characteristics, in particular, derivative values.

A method has been proposed in the patent FR3071611 making it possible to estimate first order and/or second order derivatives of the natural logarithm of the temperature and to use the derivates thus estimated as vectors of characteristics to determine the presence or not of a defect in the considered component of material. To estimate the aforementioned derivatives, the prior art firstly converts, by means of a natural logarithm function, the differences in amplitudes of the pixels (compared to the amplitude at equilibrium evaluated from the images acquired before excitation) of the digital images supplied by the infrared camera and the instants at which these digital images have been acquired, the time origin being attributed to the instant of the excitation.

The inspection method makes it possible to define and to estimate soundness parameters which are homogeneous, despite the heterogeneity of acquisition and the derivatives may be estimated according to a dedicated temporal sampling plan and fixed for all the unit zones. Nevertheless, certain unit zones are not very thick, thus associated with shorter acquisition times, and "long time" instants of estimation are not estimated. This induces a residual heterogeneity: the characteristic pixels of the different unit zones may not have the same dimensions.

Thus, in a known manner, a method for non-destructive inspection of an aeronautical component comprises:
  a step of obtaining, by means of an active infrared thermography system, a plurality of digital images of each unit zone of the aeronautical component acquired at a plurality of acquisition instants defined over a determined time period, designated acquisition period, each pixel of a digital image acquired at an acquisition instant having an amplitude at this acquisition instant at a point of the aeronautical component;
  a step of estimating, from the acquired digital image of the unit zone, at least one vector of characteristics for each pixel of said unit zone, so as to form an image of characteristics representative of the unit zone, and
  a step of annotating, from the image of characteristics, an abnormality index of each pixel of each unit zone of the aeronautical component.

In practice, the aeronautical components may further be heterogeneous, in the sense that the thermal properties of the material that compose them may vary spatially, notably with the presence of defects, and may have complex geometries. Several parameters for acquiring thermal images of such components may also be brought to vary, notably from one unit zone to another when several unit acquisitions are necessary to cover a large part of the whole. If the acquisition conditions are modified between two adjacent unit zones, which may prove to be relevant when these zones have different thicknesses, it is complex to determine the abnormality index of each pixel of each unit zone of the component. This difficulty of interpretation prevents automation of the interpretation of the vectors of characteristics.

Also, in practice, to determine the abnormality index of a unit zone, the operator uses a detection device which makes it possible to visualize a graphic interpretation of the image of characteristics in order to detect the potential presence of anomalies on the aeronautical component, to position if needs be this anomaly on the surface of said unit zone of the component and if necessary to evaluate the depth of the anomaly. This detection device is configured to provide intelligible information to the operator to help him in decision making with regard to the integrity of the aeronautical component.

A visual determination of the abnormality index of a unit zone is very time consuming, requires considerable attention and varies from one operator to another. These drawbacks are furthermore multiplied by the fact that an aeronautical component may comprise several hundred unit zones.

The invention thus aims to eliminate a least some of these drawbacks by proposing a method for non-destructive inspection of which the annotation step is at least in part automatic so as to reduce the time of determining the abnormality index of a unit zone while improving the degree of relevance.

Methods are known in the prior art from the documents US2005/008215A1, CN110322429A, U.S. Ser. No. 10/546, 207B2, U.S. Pat. No. 9,519,844B1, U.S. Pat. No. 8,287, 183B2 in which a signature characteristic of a pixel, determined from a reference signature, is compared with a static characteristic signature without taking account of a potential variability, either in the reference signature, or in the metric comparing the tested signature with the reference signature. The teachings of the preceding documents are only relevant if the stack of materials of the component is radially homogeneous.

SUMMARY

The invention relates to a method for non-destructive inspection of an aeronautical component comprising:
- a step of obtaining, by means of an active infrared thermography system, a plurality of digital images of a unit zone of the aeronautical component acquired at a plurality of acquisition instants defined over a determined time period, designated acquisition period, each pixel of a digital image acquired at an acquisition instant having an amplitude at this acquisition instant at a point of the aeronautical component;
- a step of estimating, from the acquired digital images of the unit zone, an image of characteristics representative of the unit zone, each pixel of the image of characteristics comprising a vector of characteristics,
- a step of partitioning the image of characteristics into a plurality of prediction micro-zones,
- a step of comparing the vector of characteristics of each pixel of each prediction micro-zone with a local statistical model estimated beforehand of said prediction micro-zone of said unit zone, designated hereafter local model, by means of a statistical prediction algorithm so as to determine an abnormality index for each pixel of each prediction micro-zone in order to form a micro-abnormality map of each prediction micro-zone of said unit zone, the assembly of the abnormality micro-maps of a unit zone forming an abnormality map of said unit zone,
  each local model of a prediction micro-zone having been obtained from the vectors of characteristics of the pixels of at least one annotated image of characteristics representative of the unit zone of at least one learning aeronautical component corresponding to the aeronautical component to inspect,
  the local model of a prediction micro-zone being obtained by means of a learning algorithm from the vectors of characteristics of the pixels of a learning micro-zone of the annotated image of characteristics in which the prediction micro-zone is included.

Preferably, the prediction micro-zone is entirely included in the learning micro-zone.

The architecture of local models by unit zone and by prediction micro-zone makes it possible to make a prediction that is very relevant given that, at the scale of a prediction micro-zone, the component is substantially homogeneous. Furthermore, due to this homogeneity, the local model comprises few parameters and is thus simple and rapid to implement, which accelerates the determination of the abnormality index of each pixel. In an advantageous manner, this makes it possible to define a local model with a learning base comprising a reduced number of samples. Learning is then accelerated. In addition, the local models may be learned in parallel. The use of a learning micro-zone in which the prediction micro-zone is included makes it possible to reduce the positional uncertainty linked to the acquisition of the digital images of the component. This advantageously makes it possible to smooth out effects linked to the acquisition and transitions between the prediction micro-zones. The method thus has enhanced robustness. Thanks to the invention, it is possible to model heterogeneous materials and it is possible to observe zones of transition between two sound materials.

Preferably, the method comprises a step of comparing the abnormality index of each pixel of each prediction micro-zone with a predetermined threshold in order to form a binary prediction mask of said unit zone. Such a binary prediction mask is simple to interpret by an operator.

In a preferred manner, each prediction micro-zone is centered with respect to the learning micro-zone in which it is included. This advantageously makes it possible to carry out a smoothing of the vectors of characteristics which is homogeneous on the periphery of the prediction micro-zone. Transitions between the prediction micro-zones are then improved.

Preferably, each prediction micro-zone has a dimension less than the dimension of the learning micro-zone in which it is included. Thus, such a dimension of the learning micro-zone makes it possible to reduce in an optimal manner edge effects to smooth out effects linked to the acquisition and transitions between the prediction micro-zones. In an advantageous manner, the pixels of a prediction micro-zone serve not only for the learning of the corresponding local model but also for the learning of the local models of neighboring/juxtaposed micro-zones.

Preferably, the prediction micro-zone and the learning micro-zone are concentric. Further preferably, the prediction micro-zone has a first radius and the learning micro-zone has a second radius which is greater than or equal to two times the first radius. In other words, there exists a margin between the prediction micro-zone and the learning micro-zone which is greater than or equal to the first radius. Preferably, the margin is equal to the first radius.

In a preferred manner, the learning algorithm is an incremental statistical algorithm so as to enable dynamic updating. Incremental is taken to mean that the data samples contributing to the learning are browsed sequentially and that each data sample is browsed only once in the learning process of a local model. This advantageously makes it possible to be able to supply new samples further to the learning to improve the local models. Further preferably, the learning algorithm is a statistical algorithm of FISVDD type. For this type of statistical algorithm, the algorithmic complexity of learning is proportional to S2 where S is the number of support vectors that determine the local model. Due to the low number of support vectors (linked to the local homogeneity), the FISVDD type statistical algorithm is accelerated. The complexity of management of the memory is also reduced which makes it possible to accelerate the method by parallelizing the leanings of several local models with determined technical resources (memory, computing power, etc.).

Preferably, during the obtaining step, the aeronautical component is fixedly positioned and an acquisition device of the active infrared thermography system is displaced to acquire a plurality of digital images of each unit zone, in particular in the form of a video. In a preferred manner, for each position of the acquisition system corresponding to each unit zone, the acquisition device makes it possible to acquire a digital video comprising a plurality of digital images.

In a preferred manner, the method comprises a step of analysis of the micro-abnormality map by an operator, a step of annotation of the prediction micro-zone if it contains suspect pixels in the sense of the prediction algorithmic by said operator and a step of updating the local model of said prediction micro-zone from said annotated prediction micro-zone and the learning algorithm and a step of updating the local model from the determination of the abnormality index of the prediction micro-zone.

Thus, in an advantageous manner, a local model may be updated dynamically in an incremental manner during the implementation of the inspection method.

The invention also relates to a system for non-destructive inspection of an aeronautical component comprising:

an active infrared thermography system comprising an excitation device and an acquisition device configured to acquire at a plurality of acquisition instants defined over a determined time period, designated acquisition period, the digital images of a unit zone of the aeronautical component, each pixel of a digital image acquired at an acquisition instant having an amplitude at this acquisition instant at a point of the aeronautical component after excitation of the aeronautical component by the excitation device;

an estimation device configured to estimate, from the acquired digital images of the unit zone, an image of characteristics representative of the unit zone, each pixel of the image of characteristics comprising a vector of characteristics;

a detection device configured to:

partition an image of characteristics into a plurality of prediction micro-zones, compare the vector of characteristics of each pixel of each prediction micro-zone with a local statistical model estimated beforehand of said prediction micro-zone of said unit zone, designated hereafter local model, by means of a statistical prediction algorithm so as to determine an abnormality index for each pixel of each prediction micro-zone in order to form an abnormality micro-map of each prediction micro-zone of said unit zone, the assembly of the abnormality micro-maps of a unit zone forming an abnormality map of said unit zone, each local model of a prediction micro-zone having been obtained from the vectors of characteristics of the pixels of at least one annotated image of characteristics representative of the unit zone of at least one learning aeronautical component corresponding to the aeronautical component to inspect, the local model of a prediction micro-zone being obtained by means of a learning algorithm from the vectors of characteristics of the pixels of a learning micro-zone of the annotated image of characteristics in which the prediction micro-zone is included.

The invention also targets a computer program on an information or recording support, this program being capable of being implemented in an estimation device, a detection device or more generally in a computer, this program comprising instructions suited to the implementation of the partitioning step of the method for non-destructive inspection such as described above. This program may use any programming language, and be in the form of source code, object code, or intermediate code between source code and object code, such as a partially compiled form, or any other desirable form.

The invention also targets an information or recording support that can be read by a computer, and comprising instructions for a computer program such as mentioned above. The information support may be any entity or device capable of storing the program. For example, the support may comprise a storage means, such as a ROM, for example a CD ROM or a ROM of a microelectronic circuit, or a magnetic recording means, for example a floppy disc or a hard disc. Furthermore, the information support may be a transmissible support such as an electrical or optical signal, which may be conveyed via an electric or optic cable, by radio or by other means. The program according to the invention may in particular be downloaded on an Internet type network. Alternatively, the information support may be an integrated circuit in which the program is incorporated, the circuit being suited for executing or to be used in the execution of the method in question.

BRIEF DESCRIPTION OF THE DRAWINGS

The invention will be better understood on reading the description that follows, given uniquely as an example, and by referring to the appended drawings given as non-limiting examples, in which identical references are given to similar objects and in which:

FIGS. 12A to 12C are schematic representations of a prediction micro-zone and its learning micro-zone as a function of the position of the prediction micro-zone in the unit zone.

It should be noted that the figures set out the invention in a detailed manner for the implementation of the invention, said figures obviously being able to serve to better define the invention if needs be.

DETAILED DESCRIPTION

Figure 1:
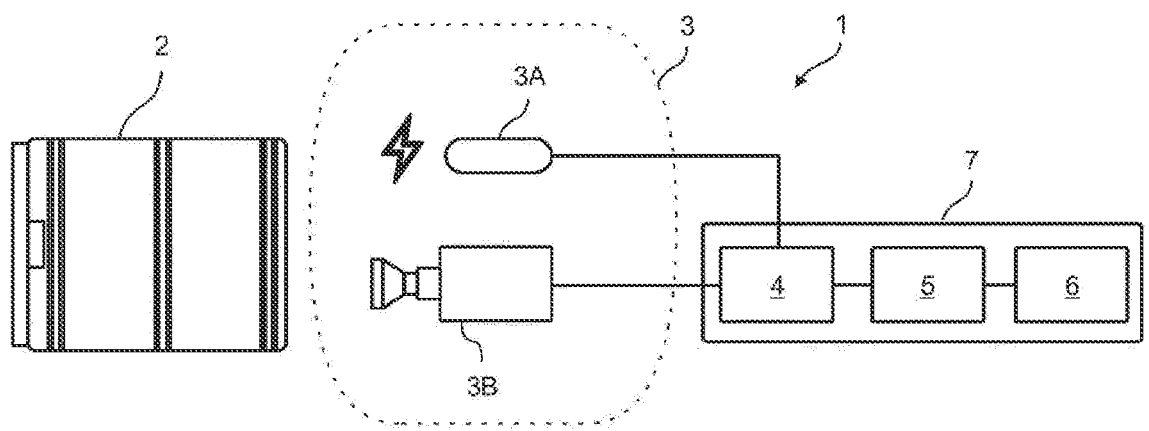
FIG. 1 is a schematic representation of a system for non-destructive inspection according to one embodiment of the invention.

With reference to FIG. 1, a system 1 for non-destructive inspection according to one embodiment of the invention is represented. In this example, the system 1 makes it possible to conduct the non-destructive inspection of large aeronautical components, heterogeneous and of complex geometry, such as for example an inner fixed structure (IFS) of a thrust reverser equipping an aircraft. However, no limitation is attached to the nature of the component to which the non-destructive inspection is applied. It may be more generally any type of component, preferably aeronautical such as for example a component equipping an aircraft engine, etc., these components being able to be of any size and geometry, heterogeneous or not, etc. It goes without saying that the invention further also applies to industrial fields other than the aeronautical field.

As illustrated in FIG. 1, the system 1 for non-destructive inspection comprises: an active thermography system 3, an estimation device 4, a detection device 5 configured to determine the abnormality index of an aeronautical component 2 from the data estimated by the estimation device 4 and a device for visualizing 6 the abnormality index of the aeronautical component 2.

As illustrated in FIG. 1, the active thermography system 3 comprises one or more excitation sources 3A configured to excite in transmission and/or in reflection. The aeronautical component 2 then positioned on a physical support provided for this purpose (not represented in the figure), and an acquisition device 3B capable of measuring the response (here thermal) of all or part of the aeronautical component 2 to the excitations of the sources 3A over a determined period Tacq can vary according to the position of the acquisition device 3B.

In the embodiment described here, the excitation source 3A is here a heat source capable of causing a pulsed excitation, of flash type for example, of the aeronautical component 2. The focus here will be made on an excitation by reflection of the aeronautical component 2.

In response to this pulsed excitation, the temperature at the surface of the aeronautical component 2 increases instantaneously (for example by 10-15 degrees). Then, the diffusion of a quantity of heat into the aeronautical component 2 results in a decrease in temperature at the surface of the aeronautical component 2 until reaching or virtually reaching the initial temperature of the aeronautical component 2 before excitation (in other words, room temperature).

The acquisition device 3B is an infrared thermal camera capable of capturing (by means of an appropriate sensor), over a determined time period (duration), designated acquisition time, the thermal surface response of the aeronautical component 2 to the pulsed excitation that is applied thereto by the excitation source(s) 3A. The infrared thermal camera 3B is further capable of supplying a temporal sequence of digital thermal images reflecting this response over the acquisition period. In a preferred manner, the infrared thermal camera 3B makes it possible to acquire a digital video comprising digital images.

Figure 3:
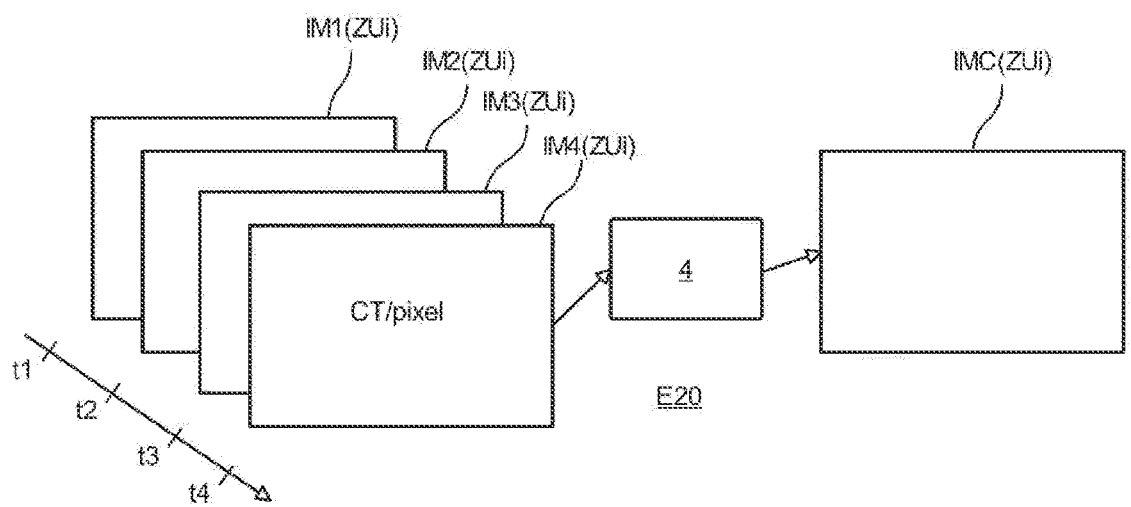
FIG. 3 is a schematic representation of the formation of an image of characteristics from a plurality of temporal digital images.

With reference to FIG. 3, each digital image IMj, j=1, ..., 4 supplied by the infrared camera corresponds to an acquisition instant tj defined over the acquisition period, J designating an integer greater than 1. The instants tj are for example spaced apart uniformly over the acquisition period. For reasons of simplification, it is here considered that the time origin is the instant of starting the excitation, in particular at the instant of excitation in the case of a pulsed excitation of the aeronautical component 2 by the infrared thermography system 3. Following the excitation by the sources(s) 3A, each digital image IMj reflects the thermal surface response of a part only of the aeronautical component 2, designated unit zone. The thermal response on the whole of the aeronautical component 2 is obtained by carrying out a plurality of unit acquisitions, each unit acquisition potentially having a different acquisition period, and each unit acquisition being carried out on a unit acquisition zone, designated unit zone ZUi, dedicated to the aeronautical component 2.

Figure 2:
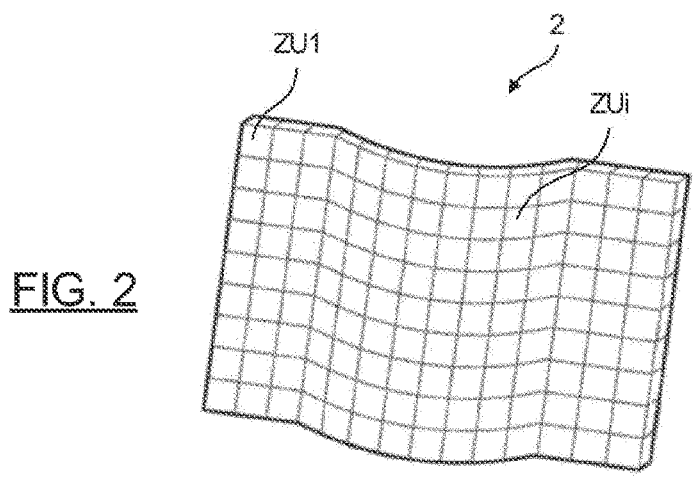
FIG. 2 is a schematic representation of the unit acquisition zones of an aeronautical component.

The dimension of the unit zones ZUi is preferentially chosen by taking into account the characteristics of the infrared thermal camera 3B and the requirements on the measurements made by the thermal camera (e.g., spatial resolution, temporal resolution, signal to noise ratio) induced by the requirements on the precision of estimation of the derivatives. Further, the unit zones ZUi are chosen such that their juxtaposition covers the entirety of the aeronautical component 2 (for example as in FIG. 2 described previously) or at least a part chosen beforehand of this aeronautical component 2 on which it is wished to base more particularly the non-destructive inspection. To carry out this plurality of unit acquisitions, the infrared camera 3B may be placed for example on an arm capable of being displaced around the aeronautical component 2 and to position the infrared camera 3B facing each unit zone ZUi. In the remainder of the description, one notes ZU1, ZU2, ..., ZUi, i designating an integer greater than 1, the unit zones ZUi considered during unit acquisitions and IMj(ZUi), j=1, ..., 4(i) the thermal images supplied by the infrared camera 3B of the unit zone ZUi. Each unit acquisition corresponds to an acquisition period or duration Tacqi, i=1, ..., N.

As mentioned previously, each digital image IMj(ZUi) of the aeronautical component 2 reflects the thermal response of the unit zone ZUi of the aeronautical component 2 at the acquisition instant tj, further to the excitation (here pulsed) applied by means of the excitation source(s) 3A. Each digital image is obtained with a same viewpoint. It comprises a plurality of pixels corresponding to a spatial sampling of the unit zone ZUi, in other words, each pixel is associated with a point of the unit zone ZUi. With reference to FIG. 3, each pixel is associated on the image IMj(ZUi) with an amplitude at the acquisition instant tj, this amplitude here being a determined increasing function of the surface temperature of the component.

In the embodiment described here, the digital thermal images supplied by the infrared camera 3B are images in two dimensions encoded in gray levels: each pixel of an image thus has an amplitude which is here a gray level reflecting the surface temperature or more precisely an increasing function of the surface temperature at a point of the aeronautical component 2 represented by the pixel. This increasing function results, in a known manner, from the combination of Planck's law on monochromatic radiation and the response, assumed linear (at least according to a certain approximation), of the sensor of the infrared camera 3B: it reflects the conversion, into a gray level, of the spectral luminance captured by the sensor of the infrared camera 3B at the point represented by the pixel, this spectral luminance reflecting the surface temperature of the aeronautical component at this point (i.e. the higher the temperature, the higher the luminance).

In accordance with the invention, the digital images acquired by the acquisition device 3 and notably by the infrared camera 3B are supplied to the estimation device 4 so as to form an image of characteristics IMC(ZUi) as illustrated in FIG. 3. In particular, from the digital images IM1(ZUi), ..., IMj(ZUi), ..., IMJ(ZUi), several images of characteristics IMC1(ZUi), ..., IMCk(ZUi), ..., IMCK(ZUi) are produced, according to a k indexed sampling specific to the estimation. Each image IMCk(ZUi) is estimated from several images {IMCj(ZUi)} with indices {j} such as {tj} its neighbors of tk (local estimation).

In the embodiment described here, the estimation device 4 is configured to estimate from the digital images supplied by the infrared camera 3B, for each pixel of the image of characteristics IMC(ZUi), a vector of characteristics VC. As an example, as taught by the patent application FR3071611A1, the vector of characteristics VC is in the form of at least one derivative of a first mathematical function f1 of the temperature with respect to a second mathematical function f2 of time, in particular, Neperian logarithm functions. It goes without saying that the vector of characteristics VC could be in a different form.

In this exemplary embodiment, the derivative is evaluated at several instants, according to an estimation sampling plan. In other words, a collection of images of characteristics with scalar values IMCk(ZUi) or an image of characteristics with vectorial values IMC(ZUi) (that is to say that each pixel contains a vector) is considered. Thus, the vector of characteristics VC is with vectorial value, more precisely, it is a vector of which the components are logarithmic derivatives estimated at different instants {k}.

In the embodiment described here, the estimation device 4 has the hardware architecture of a computer. It comprises, notably, a processor, a random access memory, a read-only memory, a non-volatile flash memory as well as communication means notably enabling the estimation device to communicate with the detection device 5. These communication means comprise for example a digital data bus or if the estimation device 4 and the detection device 5 are connected via a telecommunications network (local or other, wired or wireless, etc.), a network card or an interface making it possible to communicate on this network. In a preferred manner, the detection device 5 has the hardware architecture of a computer. Further preferably, the same applies to the visualization device 6. In this example, with reference to FIG. 1, the estimation device 4, the detection device 5 and the visualization device 6 may be located within a same equipment 7, for example a computer.

The read-only memory of the detection device 5 constitutes a recording support in accordance with the invention, readable by the processor and on which is recorded a computer program in accordance with the invention.

As mentioned previously, the system 1 for non-destructive inspection also comprises a device for detecting 5 the aeronautical component 2. This detection device 5 is configured to make it possible to check the integrity of the aeronautical component 2 (that is to say to detect the presence of defects/anomalies in the aeronautical component 2) by analyzing the vector(s) of characteristics VC obtained by the estimation device 4. The detection device 5 is configured to determine the abnormality index of each pixel of a unit zone ZUi.

According to the invention, the detection device 5 is configured to detect automatically defects on the aeronautical component 2 from the images of characteristics IMC supplied by the estimation device 4 and to determine a diagnosis as to the integrity of the aeronautical component 2 (e.g., detection or not of indications in the structure of material allowing a defect or an anomaly to be suspected), without requiring the intervention of an operator.

Figure 4:
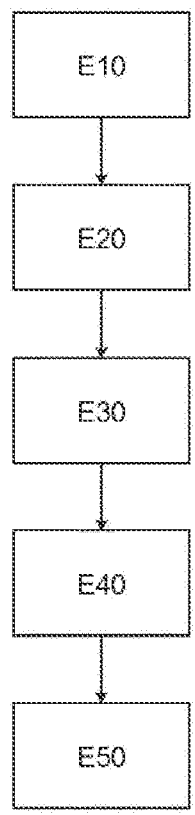
FIG. 4 is a schematic representation of the steps of the method for non-destructive inspection.

FIG. 4 represents the different steps of the method implemented by the system 1 for non-destructive inspection illustrated in FIG. 1 to conduct a non-destructive inspection of the aeronautical component 2 in accordance with the invention. In accordance with the invention, the non-destructive inspection of the aeronautical component is based on an active infrared thermography method. This method, known per se and briefly recalled previously, is implemented by the active thermography system 3. More particularly, the active thermography system 3 applies, by means of excitation sources 3A, a pulsed excitation, here by reflection, on the aeronautical component 2 positioned on its support provided for this purpose. The thermal response of the aeronautical component 2 to this pulsed excitation is captured by the infrared camera 3B during a determined acquisition period, at a plurality of acquisition instants. In the example envisaged here, the aeronautical component 2 being an IFS of large size, several unit acquisitions are successively carried out on the aeronautical component 2 as mentioned previously.

Each unit acquisition is carried out over a unit acquisition period equal to Tacqn, each unit acquisition targeting a distinct unit zone ZUi, i=1, ..., N, the N juxtaposed unit acquisition zones ZUi making it possible, as mentioned previously, to cover the whole of the aeronautical component 2. The infrared camera 3B generates, for each unit acquisition indexed by i, a plurality of digital images IMj, j=1, ..., J(n) of the aeronautical component 2 representing the response thus captured of the aeronautical component at different acquisition instants tj, j=1, ..., 3(i) (step E10). In the embodiment described here, it is assumed that the acquisition instants tj, j=1, ..., 3(i) defined over a time period Tacqn are spaced apart uniformly with a sufficiently small pitch to have a good representation of the thermal response of the unit zone ZUi of the aeronautical component 2 to the pulsed excitation applied to the component, and a redundancy of observation enabling a precise estimation in the presence of statistical observation noise. The digital images IMj(ZUi) acquired on each of the considered unit zones ZUi represent the evolution of the temperature on the surface of the aeronautical component 2 further to the pulsed excitation that has been applied thereto by means of the excitation source(s) 3A. More particularly, each pixel noted PIX of a digital image IMj(ZUi) corresponds to a point of the unit zone ZUi resulting from a spatial sampling of the latter. Each pixel PIX of the image IMj(ZUi) has an amplitude noted amp(PIX) which represents an increasing function of the surface temperature of the aeronautical component 2, at the acquisition instant tj, at the point of the unit zone ZUi corresponding to this pixel.

The digital images IMj(ZUi), j=1, ..., J, i=1, ..., N acquired by the digital camera 3B are next supplied by the active thermography system 3 to the estimation device 4. In accordance with the invention, the estimation device 4 estimates, from the digital thermal images that are supplied thereto, an image of characteristics IMC(ZUi) in which each pixel noted PIX is associated with a vector of characteristics VC as described for example by the patent application FR3071611 (step E20).

The estimation device 4 supplies the image of characteristics IMC of each of the unit acquisition zones ZUi to the detection device 5 which carries out a step of partitioning (step E30) and a step of comparison (step E40) in order to determine an abnormality micro-map, in particular a prediction map CDP or a prediction mask MDP, which is transmitted to the visualization device 6 in order to be consulted by an operator (step E50).

The partitioning step E30 will henceforth be described in detail.

Figure 5A:
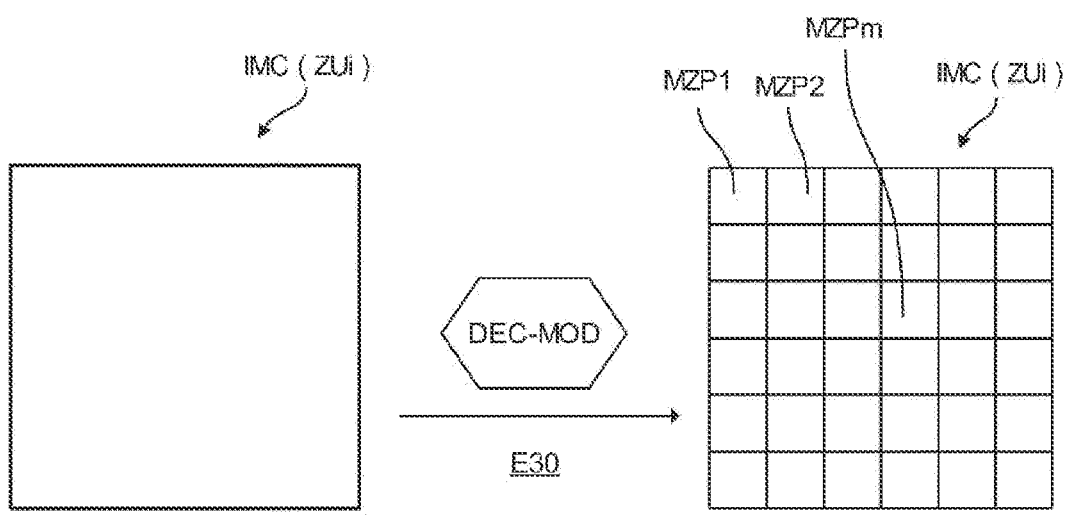
FIG. 5A is a schematic representation of a step of partitioning an image of characteristics into prediction micro-zones.

According to the invention, with reference to FIG. 5A, each image of characteristics IMC of a unit zone ZUi is divided/carved/partitioned into a plurality of prediction micro-zones MZPm (ZUi) comprising a plurality of pixels. The division is made from a carving model DEC-MOD configured to form prediction micro-zones MZPm(ZUi) which are relevant. In this example, the prediction micro-zones MZPm(ZUi) have the same form but it goes without saying that they could be different. Each prediction micro-zone MZPm(ZUi) comprises a plurality of pixels. Each pixel of an image of characteristics IMC only belongs to a single prediction micro-zone MZPm(ZUi). The fact of using micro-zones larger than a pixel makes it possible to learn the distribution of the local variability by exploiting the hypothesis of locally homogeneous data.

As described previously, each pixel is associated with a vector of characteristics VC. As will be described in detail hereafter, the aim is to determine the abnormality index of each pixel of each prediction micro-zone MZPm of each unit zone ZUi of the aeronautical component 2.

Figure 5B:
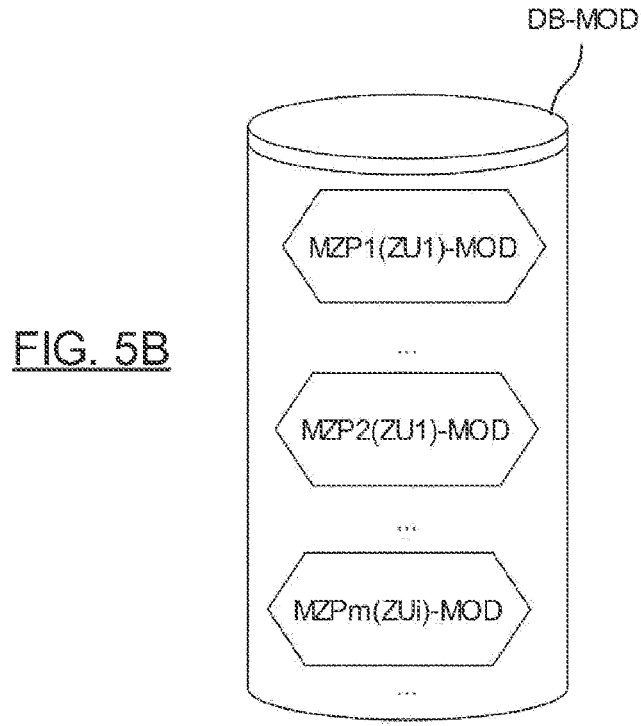
FIG. 5B is a schematic representation of a database of local models.

In order to determine the abnormality index, with reference to FIG. 5B, the method implements a database DB-MOD comprising a plurality of local models MZPm(ZUi)-MOD, each being specific to a prediction micro-zone MZPm of a unit zone ZUi as will be described hereafter.

Figure 6:
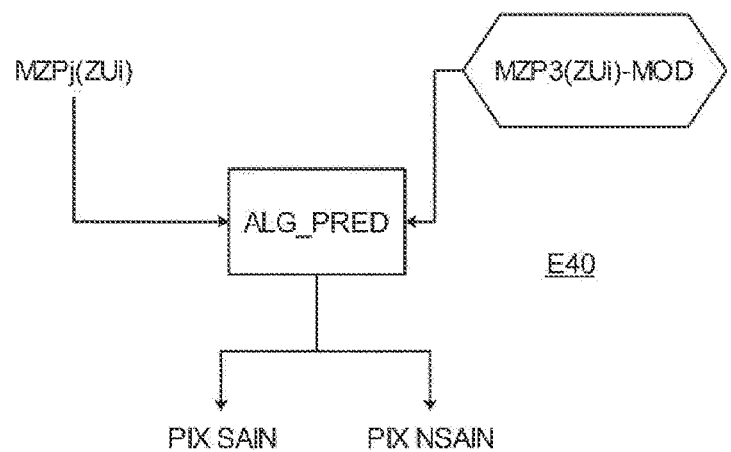
FIG. 6 is a schematic representation of a step of comparison in order to determine an abnormality index of a pixel of a prediction micro-zone.

During the implementation of the comparison step E40, with reference to FIG. 6, each prediction micro-zone MZPm (ZUi) is compared, using a statistical prediction algorithm ALG_PRED, with a local statistical model estimated beforehand MZPm(ZUi)-MOD, designated hereafter local model for the sake of brevity, so as to determine the abnormality index. For a given pixel of said prediction micro-zone MZPm(ZUi), a low abnormality index corresponds to a sound pixel SAIN whereas a high abnormality index corresponds to an unsound pixel NSAIN.

In this example, a statistical prediction algorithm ALG_PRED of FISVDD (Fast Incremental Support Vector Data Description) type, for example known by the document—H. Jiang, H. Wang, W. Hu, D. Kakde, and A. Chaudhuri, "Fast Incremental SVDD Learning Algorithm with The Gaussian Kernel", August 2017 (https://www.researchgate.net/publication/319463824) Fast Incremental SVDD Learning Algorithm with The Gaussian Kernel), is implemented given that it has numerous advantages in the context of the invention. Such a statistical prediction algorithm ALG_PRED implements support vectors and is particularly efficient when the number and the dimension of the support vectors are reduced. This is the case in the present implementation given that each local model MZPm(ZUi)-MOD has a reduced number of support vectors on account of its locality as will be described hereafter. According to the invention, with reference to FIG. 5B, a database DB-MOD of local models MZPm(ZUi)-MOD is available. The learning of a local model MZPm(ZUi)-MOD will be described hereafter.

The statistical prediction algorithm ALG_PRED is preferably unsupervised and is based on as exhaustive as possible knowledge of sound data and does not require exhaustive knowledge of the defects that can be envisaged. Thus, two different vectors of characteristics VC may lead to the same abnormality index.

The use of local models naturally makes it possible to discriminate by the position a vector of characteristics VC of a pixel that may be normal in a given micro-zone and abnormal in a neighboring micro-zone. Incidentally, a global model does not make it possible to detect such an anomaly, of which the detectability relies on the precise position.

Figure 7:
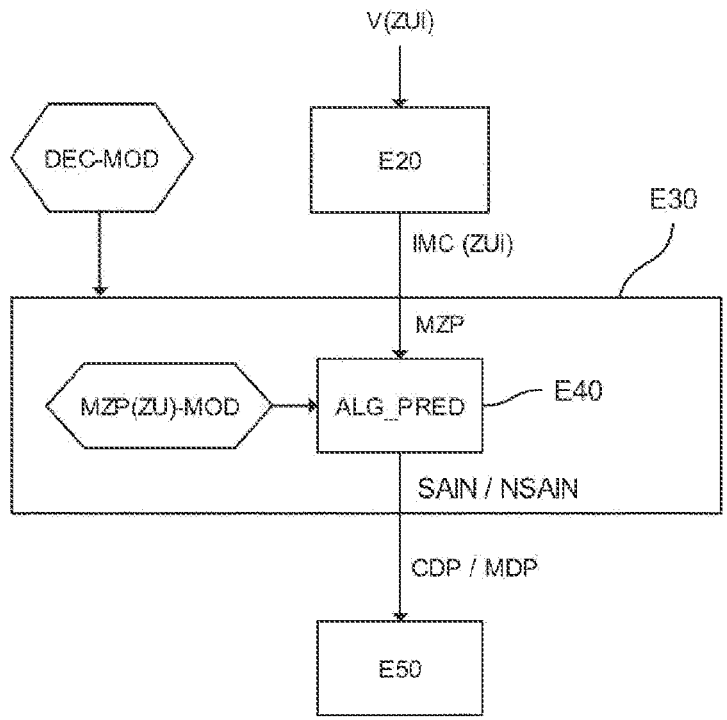
FIG. 7 is a schematic representation of the implementation of a prediction method.

With reference to FIG. 7, a video V(ZUi) of a unit zone ZUi is represented which undergoes a step of estimation E20 of the vectors of characteristics VC of its pixels as described previously in such a way as to form an image of characteristics IMC(ZUi).

The method comprises a step of partitioning E30 during which each image of characteristics IMC(ZUi) is carved into prediction micro-zones MZPm(ZUi) through the use of the predetermined carving model DEC-MOD.

The method next comprises a step of comparison E40 in which each prediction micro-zone MZPm(ZUi) is next compared with its local model MZPm(ZUi)-MOD so as to determine, using the statistical prediction algorithm ALG_PRED, the abnormality index (SAIN or NSAIN) of each pixel of each prediction micro-zone MZPm(ZUi). Such a comparison step E40 is simple and rapid to carry out because the local model MZPm(ZUI)-MOD has a small dimension and has been determined in optimal acquisition conditions. The necessary computing power is thus reduced.

In an advantageous manner, the estimation of the abnormality index of each pixel of each prediction micro-zone MZPm(ZUi) may be carried out in parallel so as to reduce the time for processing a unit zone ZUi.

In practice, during the step of comparison E40, for each characteristic pixel z the following formula is applied to determine the level of abnormality.

$$Q(z) = \Sigma_i a_i K(x_i, x_i) - \Sigma_i a_i K(z, x_i) \qquad [\text{Math.1}]$$

formula in which $\alpha_i$ are the Lagrange multipliers of the support vectors

K is the kernel function $x_i$ are the support vectors and are of same dimension as the characteristic pixels and even constitute, by construction, a selection among all the pixels observed in the learning process.

$\alpha_i$ and the $x_i$ are learned in the learning process and constitute the parameters of the local model.

By construction, when the abnormality index Q(z) is less than 0, the pixel z is "sound". Conversely, when the abnormality index Q(z) is greater than 0, the pixel z is "unsound". In other words, no similar pixel has been observed during the learning. From the abnormality indices Q(z) of each unit zone ZUi, it is possible to form a prediction map CDP(ZUi). Such a prediction map CDP(ZUi) makes it possible to facilitate the decision making of the operator by presenting to him only relevant information, in particular, continuous information. By thresholding the abnormality indices Q(z) of a prediction map CDP, a binary prediction mask MDP with binary information (sound SAIN or unsound NSAIN abnormality index) is obtained in an advantageous manner.

Thus, for each unit zone ZUi, the pixels of the prediction micro-zones MZPm(ZUi) having a sound abnormality index SAIN are determined automatically.

As illustrated in FIG. 7, the method comprises a step of visualization E50 during which the operator can visually estimate the abnormality indices of the different pixels of the prediction micro-zones MZPm(ZUi) of a unit zone ZUi. The operator can then determine if the pixels of the prediction micro-zones MZPm(ZUi) considered as unsound are actually defective or correspond to a false alert. An operator can thus focus his attention and his expertise for pixels of which the abnormality index is unsound NSAIN, in order to determine if the prediction micro-zones MZPm(ZUi) actually comprise an anomaly.

Figure 8:
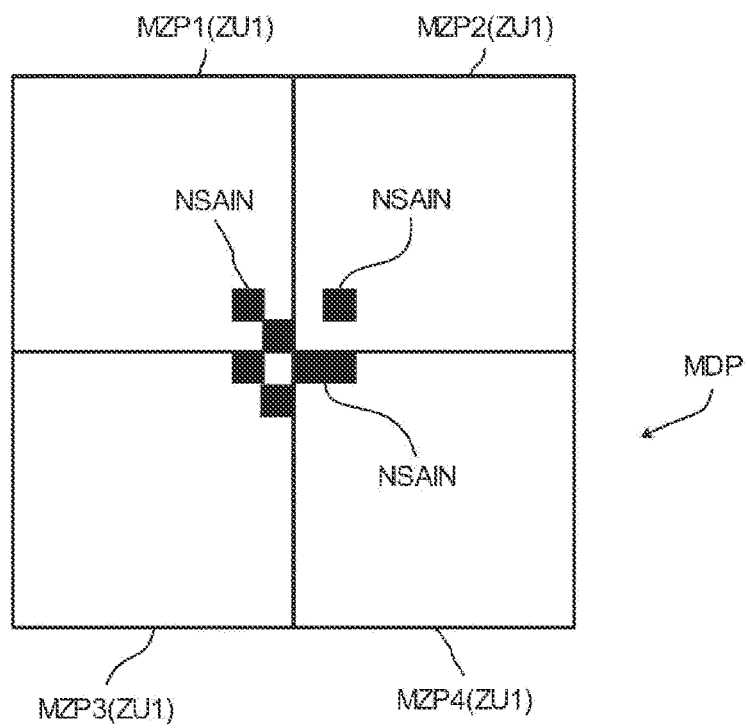
FIG. 8 is a schematic representation of a binary prediction mask of several prediction micro-zones of a unit zone.

With reference to FIG. 8, a binary prediction mask MDP of several prediction zones MZP1-MZP4 of the first unit zone ZU1 is represented in a schematic manner in which seven pixels are considered as unsound (represented in black in FIG. 8). In an advantageous manner, the operator can determine if the pixels considered as unsound are actually defective or correspond to a false alarm.

The determination of a local model MZPm(ZUi)-MOD that is relevant while having a low computational cost will henceforth be described.

Figure 9:
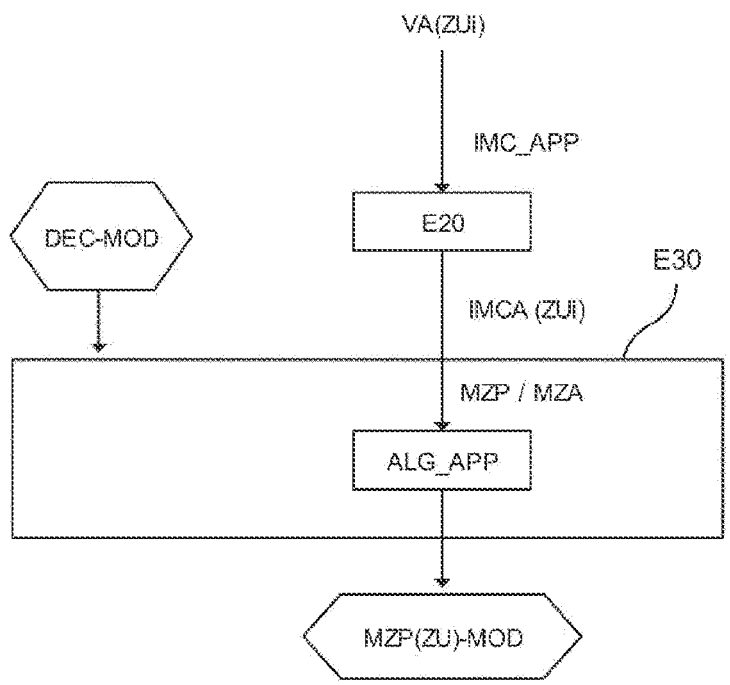
FIG. 9 is a schematic representation of the implementation of a method for learning from a local model.
Figure 10:
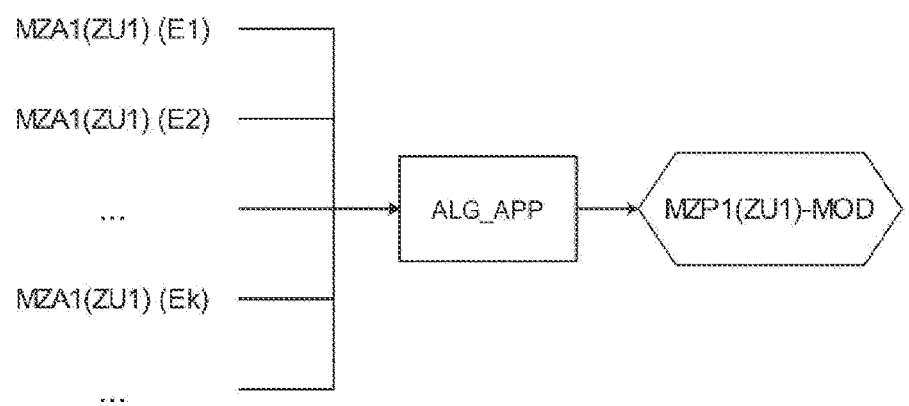
FIG. 10 is a schematic representation of the obtaining of a local model from a plurality of learning micro-zones.

In this example, with reference to FIGS. 9 and 10, an incremental statistical learning algorithm ALG_APP of FISVDD (Fast Incremental Support Vector Data Description) type is implemented for the learning. As will be described hereafter, each local model MZPm(ZUi)-MOD is determined by learning.

With reference to FIG. 9, an annotated video VA(ZUi) is available, that is to say a video of a unit zone ZUi of a sample of a learning aeronautical component 2_APP, corresponding to the aeronautical component 2 to inspect, of which the abnormality index (SAIN or NSAIN) has been determined beforehand for each pixel. Preferably, only videos having pixels exempt of anomaly are used. Alternatively, a video containing an anomaly may serve for the learning or the updating of the local models. Only the normal pixels of said video will be visited in the course of the learning process. Each annotated video VA(ZUi) comprises a plurality of learning images IMC_APP.

The learning images IMC_APP undergo a step of estimation E20 of the vectors of characteristics VC of its pixels as described previously so as to form an annotated image of characteristics IMCA(ZUi).

The annotated image of characteristics IMCA(ZUi) is carved into prediction micro-zones MZPm(ZUi), in accordance with the partitioning step E30 described previously, by use of the predetermined carving model DEC-MOD. In an advantageous manner, the variability of the prediction micro-zones MZPm(ZUi) is small for a same unit zone ZUi given that, for such a non-destructive inspection, the aeronautical component 2 is positioned in a very precise manner on its support. Such a characteristic makes it possible to reduce the heterogeneity and thus the dimension of the local model. The abnormality index (SAIN or NSAIN) of each pixel of each prediction micro-zone MZPm(ZUi) is known on account of the annotations.

According to the invention, the local model MZPm(ZUi)-MOD of a prediction micro-zone MZPm(ZUi) is obtained by means of the learning algorithm ALG_APP from the vectors of characteristics VC of the pixels of a learning micro-zone MZAm(ZUi) of the annotated image of characteristics IMCA(ZUi) in which the prediction micro-zone MZPm(ZUi) is included.

Figure 11:
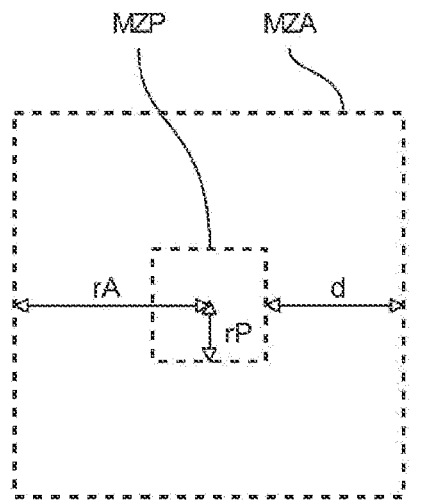
FIG. 11 is a schematic representation of a prediction micro-zone associated with a learning micro-zone.

With reference to FIG. 11, an exemplary profile of a learning micro-zone MZA having a square shape is represented. It goes however without saying that it could have a different shape, notably substantially circular. The learning micro-zone MZA comprises a prediction micro-zone MZP which is, preferably, centered with respect to the learning micro-zone MZA. In a preferred manner, the prediction micro-zone MZP represents between 5% and 15% of the surface of the learning micro-zone MZA so as to limit any edge effect.

As illustrated in FIG. 11, each prediction micro-zone MZP has a first radius rP and each learning micro-zone MZA has a second radius rA which is greater than or equal to two times the first radius rP. Preferably, the prediction micro-zone MZP and the learning micro-zone MZA are concentric. In other words, there exists a margin d between the prediction micro-zone MZP and the learning micro-zone MZA that is greater than or equal to the first radius rP (d=rA−rP). In a preferred manner, the margin d is equal to the first radius rP. Such a margin d makes it possible to take into account the cumulated uncertainty of position (component position error and acquisition device position error) and to reduce the number of learning components by valorizing the local homogeneity.

Figure 12A:
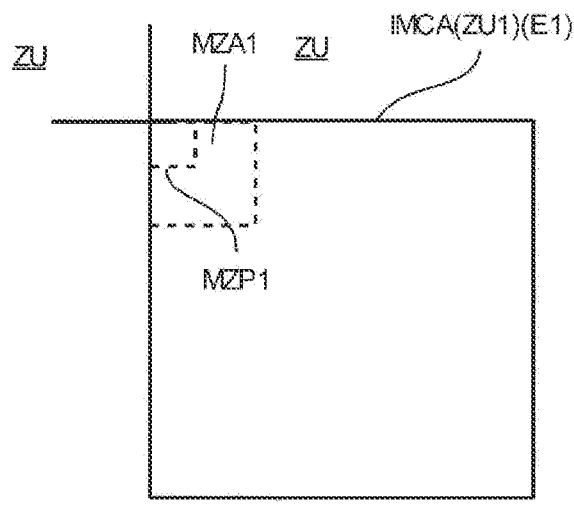
FIG. 12A
Figure 12B:
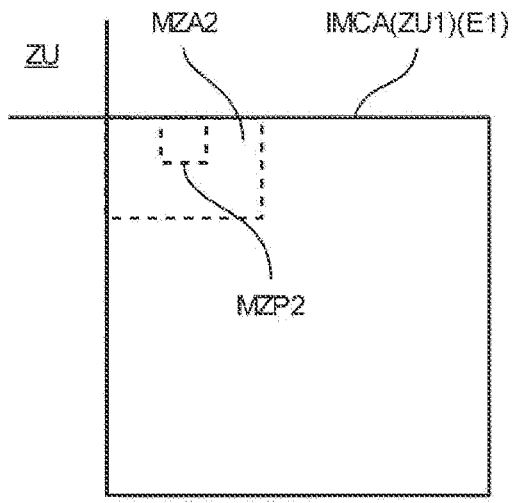
FIG. 12B
Figure 12C:
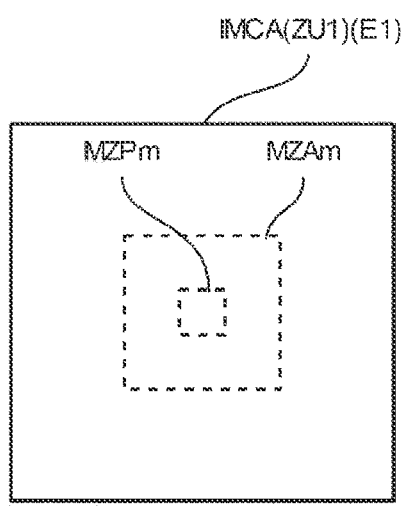

With reference to FIGS. 12A to 12C, several learning micro-zones MZA of a same unit zone ZU1 of an annotated image of characteristics IMCA of a first sample μl of an aeronautical component 2 are represented. Each learning micro-zone MZA belongs uniquely to the unit zone ZU1 to which the prediction micro-zone MZP associated with the learning micro-zone MZA belongs.

Also, as illustrated in FIGS. 12A and 12B, the learning micro-zones MZA are truncated given that their prediction micro-zones MZP are positioned on an edge of the unit zone ZU1. Conversely, as illustrated in FIG. 12C, the learning micro-zone MZA extends in a peripheral manner around the prediction micro-zone MZP.

In this example, with reference to FIG. 10, from several samples E1, E2, . . . , Ek, . . . of a learning aeronautical component 2_APP, a plurality of first learning micro-zones MZA1(ZU1)(Ek) of a same first prediction micro-zone MZP1 of a same first unit zone ZU1 are determined. The abnormality index is known for each pixel of each learning micro-zone MZA1(ZU1)(Ek). It is thus possible to estimate, using the learning algorithm ALG_APP, the local model MZP1(ZU1)-MOD for the first prediction micro-zone MZP1 of the first unit zone ZU1.

The learning is repeated to obtain a local model MZP1(ZU1)-MOD for each prediction micro-zone MZPm of each unit zone ZUi. In an advantageous manner, the reduced dimension of each prediction micro-zone MZPm coupled to an acquisition of large quality (small variation in acquisition conditions since the aeronautical component 2 is supported in a precise manner) makes it possible to form local models MZPm(ZUi)-MOD having a small dimension, which accelerates their determination. Given that the model is local, it has a reduced complexity compared to a global model which has to take account of greater heterogeneity. The greater the heterogeneity, the greater the number of parameters to define the local model. The greater the number of samples Ek, the more the local model MZP1(ZU1)-MOD will be relevant by including the variability between each component. Preferably, the samples Ek belong to a learning base BA which has been annotated beforehand.

In FIG. 10 is shown a statistical learning method from a learning base BA obtained beforehand, but the learning method may also be dynamic as will be described hereafter with reference to FIG. 13.

An incremental learning algorithm ALG_APP is preferred given that it makes it possible to update the local model MZPm(ZUi)-MOD as and when images of learning characteristics IMC_APP are obtained as will be described hereafter. Incremental is taken to mean that each image of characteristics contributing to the learning is only browsed once in the learning process of a local model. Thus, the relevance of the local model increases as time goes by.

Figure 13:
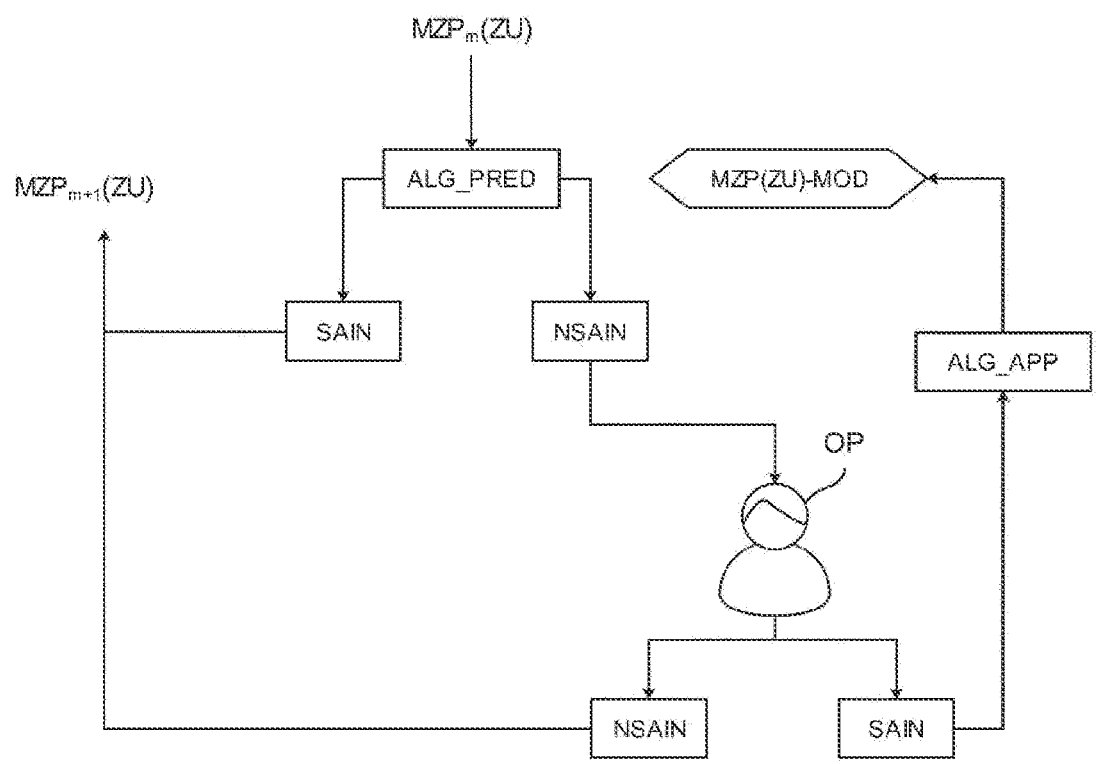
FIG. 13 is a schematic representation of an implementation of a dynamic learning method.

In an advantageous manner, the learning method is dynamic and coupled to the detection method as illustrated in FIG. 13.

During the implementation of the method for predicting a prediction micro-zone MZPm(ZUi), the prediction algorithm ALG_PRED, by relying on the local model MZPm(ZUi)-MOD, determines if the pixels of the prediction micro-zone MZPm(ZUi) are sound SAIN or unsound NSAIN. If all the pixels are sound SAIN, the prediction method is implemented for another prediction micro-zone MZPm+1(ZUi).

If one or more pixels of the prediction micro-zone MZPm(ZUi) are unsound NSAIN, an operator OP analyzes the prediction map CDP or the binary prediction mask MDP of the prediction micro-zone MZPm(ZUi) in order to determine potential false alerts. If everything is compliant for the operator OP, the prediction method is implemented for another prediction micro-zone MZPm+1(ZUi). Conversely, if the operator OP detects a false alert, a pixel considered as unsound NSAIN is in reality SAIN, he annotates said prediction micro-zone MZP(ZUi) and transmits it to the learning algorithm ALG_APP which updates the local model MZPm(ZUi)-MOD on which the prediction algorithm ALG_PRED is based. Thus, the local model MZPm(ZUi)-MOD is refined for a reduced computational cost given that the learning algorithm ALG_APP is incremental.

Thanks to the local models, it is possible to do without very heterogeneous vectors of characteristics between geographically close zones and/or having different thicknesses. In addition, the use of a high-performance prediction ALG_PRED and learning ALG_APP algorithm enables an increase in relevance as and when they are used for a low computational cost, which is optimal for the analysis of aeronautical components of large size.

The invention claimed is:

1. A method for non-destructive inspection of an aeronautical component comprising:
a step of obtaining, by means of an active infrared thermography system, a plurality of digital images of a unit zone of the aeronautical component acquired at a plurality of acquisition instants defined over a determined time period, designated acquisition period, each pixel of a digital image acquired at an acquisition instant having an amplitude at this acquisition instant at a point of the aeronautical component; the aeronautical component being fixedly positioned and an acquisition device of the active infrared thermography system is displaced to acquire a plurality of digital images of each unit zone,
a step of estimating, from the acquired digital images of the unit zone, an image of characteristics representative of the unit zone, each pixel of the image of characteristics comprising a vector of characteristics,
a step of partitioning said image of characteristics into a plurality of prediction micro-zones, each prediction micro-zone comprising a plurality of pixels,
a step of comparing the vector of characteristics of each pixel of each prediction micro-zone with a local statistical model estimated beforehand of said prediction micro-zone of said unit zone, designated hereafter local model, by means of a statistical prediction algorithm so as to determine an abnormality index for each pixel of each prediction micro-zone in order to form an abnormality micro-map of each prediction micro-zone of said unit zone, the assembly of the abnormality micro-maps of a unit zone forming an abnormality map of said unit zone,
each local model of a prediction micro-zone having been obtained from the vectors of characteristics of the pixels of at least one annotated image of characteristics representative of a unit zone of at least one learning aeronautical component corresponding to the aeronautical component to inspect, the unit zone of at least one learning aeronautical component corresponding to the unit zone of the aeronautical component to inspect;
the local model of a prediction micro-zone being obtained by means of a learning algorithm from the vectors of characteristics of the pixels of a learning micro-zone of the annotated image of characteristics, the annotated image of characteristics being partitioned into prediction micro-zones in a manner analogous to previously, each prediction micro-zone of the annotated image of characteristics being included in a learning micro-zone of the annotated image of characteristics.

2. The method according to claim 1, comprising a step of comparing the abnormality index of each pixel of each prediction micro-zone with a predetermined threshold in order to form a binary prediction mask of said unit zone.

3. The method according to claim 1, wherein each prediction micro-zone is centered with respect to the learning micro-zone in which it is included.

4. The method according to claim 1, wherein each prediction micro-zone has a dimension less than the dimension of the learning micro-zone in which it is included.

5. The method according to claim 4, wherein the prediction micro-zone and the learning micro-zone are concentric.

6. The method according to claim 1, wherein the prediction micro-zone has a first radius and the learning micro-zone has a second radius which is greater than or equal to two times the first radius.

7. The method according to claim 1, wherein the learning algorithm is an incremental statistical algorithm so as to enable dynamic updating.

8. The method according to claim 7, wherein the learning algorithm is a statistical algorithm of FISVDD (Fast Incremental Support Vector Data Description) type.

9. The method according to claim 1, comprising a step of analysis of the abnormality map by an operator, a step of annotation of the prediction micro-zone, if it contains suspect pixels in the sense of the prediction algorithmic, by said operator and a step of updating the local model of said prediction micro-zone from said annotated prediction micro-zone and the learning algorithm.

10. A system for non-destructive inspection of an aeronautical component comprising:
an active infrared thermography system comprising an excitation device and an acquisition device configured to acquire at a plurality of acquisition instants defined over a determined time period, designated acquisition period, digital images of a unit zone of the aeronautical component, each pixel of a digital image acquired at an acquisition instant having an amplitude at this acquisition instant at a point of the aeronautical component after excitation of the aeronautical component by the excitation device; the aeronautical component being fixedly positioned and the acquisition device of the active infrared thermography system being configured to be displaced to acquire a plurality of digital images of each unit zone, an estimation device configured to estimate, from the acquired digital images of the unit zone, an image of characteristics representative of the unit zone, each pixel of the image of characteristics comprising a vector of characteristics, a detection device configured to:

partition an image of characteristics into a plurality of prediction micro-zones, each prediction micro-zone comprising a plurality of pixels, compare the vector of characteristics of each pixel of each prediction micro-zone with a local statistical model estimated beforehand of said prediction micro-zone of said unit zone, designated hereafter local model, by means of a statistical prediction algorithm so as to determine an abnormality index for each pixel of each prediction micro-zone in order to form an abnormality micro-map of each prediction micro-zone of said unit zone, the assembly of the abnormality micro-maps of a unit zone forming an abnormality map of said unit zone, each local model of a prediction micro-zone having been obtained from the vectors of characteristics of the pixels of at least one annotated image of characteristics representative of a unit zone of at least one learning aeronautical component corresponding to the aeronautical component to inspect, the unit zone of at least one learning aeronautical component corresponds to the unit zone of the aeronautical component to inspect;

the local model of a prediction micro-zone being obtained by means of a learning algorithm from the vectors of characteristics of the pixels of a learning micro-zone of the annotated image of characteristics, the annotated image of characteristics being partitioned into prediction micro-zones in a manner analogous to previously, each prediction micro-zone of the annotated image of characteristics being included in a learning micro-zone of the annotated image of characteristics.

* * * * *